United States Patent [19]

Hu

[11] Patent Number: 5,717,607
[45] Date of Patent: Feb. 10, 1998

[54] COMPUTER PROGRAM, SYSTEM AND METHOD TO REDUCE SAMPLE SIZE IN ACCELERATED RELIABILITY VERIFICATION TESTS

[75] Inventor: Jun Ming Hu, Canton, Mich.

[73] Assignee: Ford Motor Company, Dearborn, Mich.

[21] Appl. No.: 723,385

[22] Filed: Sep. 30, 1996

Related U.S. Application Data

[63] Continuation-in-part of Ser. No. 543,418, Oct. 16, 1995.

[51] Int. Cl.$^6$ ........................................... G06F 17/60
[52] U.S. Cl. ........................... 364/552; 364/468.16
[58] Field of Search .............................. 364/552, 554, 364/468.15, 468.16, 468.17

[56] References Cited

U.S. PATENT DOCUMENTS

| | | | |
|---|---|---|---|
| 4,472,784 | 9/1984 | Blackman | 364/554 |
| 4,780,828 | 10/1988 | Whisker | 364/464.02 |
| 4,811,247 | 3/1989 | Maladay et al. | 364/552 |

(List continued on next page.)

OTHER PUBLICATIONS

Hu et al., "Role of Failure–Mechanism identification in Accelerated Testing", Journal of IES, Jul./Aug. 1993, pp. 39–46.

(List continued on next page.)

Primary Examiner—James P. Trammell
Assistant Examiner—Eric W. Stamber
Attorney, Agent, or Firm—Richard D. Dixon

[57] ABSTRACT

A method for determining a sample size W required for accelerated testing of a product includes the steps of selecting a Reliability Goal R as appropriate for the product, selecting a Confidence Level CL appropriate for the accuracy required from the results of the accelerated testing, selecting the number of testing cycles $N_t$ defining the accelerated testing period, calculating the Sample Size W for the accelerated testing as

$$W = \frac{\text{Log}(1 - CL)}{\text{Log} R(N_t)}$$

and then testing the W product samples for the $N_t$ testing cycles to validate the required Reliability when no test failures are observed over the $N_t$ testing cycles. A method for determining the Number of Cycles $N_t$ required for accelerated testing of a product having a service lifetime is also described. In either of the above methods, if any failures are observed in the $N_t$ testing cycles/time, then the number of testing cycles/time may be extended to at least $2 N_t$ and a new Confidence Level is calculated as: $CL_{NEW} = 1 - \sum_{x=0}^{NF} \frac{W!}{x!(W-x)!} [1 - R(2N_t)]^x R(2N_t)^{w-x}$ The Reliability Goal R for the product design is validated if the new Confidence Levels $CL_{NEW}$ is greater than a $CL_{min}$ value specified as a minimum confidence level required for the accelerated testing method.

13 Claims, 5 Drawing Sheets

U.S. PATENT DOCUMENTS

| | | | |
|---|---|---|---|
| 5,047,947 | 9/1991 | Stump | 364/468.13 |
| 5,270,957 | 12/1993 | Murray | 364/554 |
| 5,278,495 | 1/1994 | Beaton et al. | 324/158.1 |
| 5,282,150 | 1/1994 | Yamada | 364/554 |
| 5,291,419 | 3/1994 | Satoh et al. | 364/508 |
| 5,301,118 | 4/1994 | Heck et al. | 364/468.16 |
| 5,308,932 | 5/1994 | Manduley et al. | 177/25.15 |
| 5,404,509 | 4/1995 | Klein | 395/612 |
| 5,465,221 | 11/1995 | Merat et al. | 364/552 |
| 5,565,618 | 10/1996 | Hu | 73/1 R |

OTHER PUBLICATIONS

J.M. Hu, "Physics–of–Failure–Based Reliability Qualification of Automotive Electronics", Communications in RMS, Jul. 1994, pp. 21–33.

J.M. Hu, "Life Prediction and Acceleration Based on Power Spectral Density of Random Vibration", Proceedings–Institute of Environmental Sciences, 1994, pp. 60–68.

Rothman et al., "Test–Time Compression for Qualification Testing of Electronic Packages: a Case Study", 1995 Proceedings Annual Reliability and Maintainability Symposium, pp. 246–252.

Joseph Juran, *Quality Control Handbook*, McGraw–Hill Book Company, Third Edition (1974), Chapter 12 (Inspection and Test), Chapter 22 (Basic Statistical Methods), and Chapter 24 (Sampling by Attributes).

COMPUTER PROGRAM, SYSTEM AND METHOD TO REDUCE SAMPLE SIZE IN ACCELERATED RELIABILITY VERIFICATION TESTS

This is a continuation-in-part of application Ser. No. 08/543,418 filed Oct. 16, 1995.

BACKGROUND OF THE INVENTION

1. Field of the Invention

The present invention relates to a computer program and method for validating the reliability of a product based upon the number of testing cycles/time and the sample size in an accelerated test.

2. Description of the Prior Art

New designs and manufacturing processes often are validated for long-term reliability by accelerated reliability verification tests, such as vibration test and thermal cycle/shock tests. These tests are included in many design verification and product validation (DV/PV) processes. The goal of the verification test is to obtain a correct reliability assessment of the products in field operation. Because failure is a random phenomenon, the fewer the samples in a test, the lower the confidence in the test results. Inadequate sample size selection in a reliability test often leads to misleading results. Therefore, a complete test specification should include a minimum sample size requirement. Unfortunately, the available DV/PV specifications of most products don't specify the sample size requirement due to lack of methodology for accelerated testing. This could be one of the reasons why some products pass verification testing, but will not perform for their full planned life in the field.

An object of the present invention is to define an accelerated testing method whereby either a reduced sample size of products may be tested for a predetermined number of testing cycles, or whereby a standard sample size may be tested for a reduced number of testing cycles. Either of these accelerated tests results in the validation of the reliability for the product design with a confidence level exceeding that required for the accelerated testing.

SUMMARY OF THE INVENTION

The present invention describes a computer program and method for determining a sample size W required for accelerated testing of a product includes the steps of:

(a) selecting a Reliability Goal R as appropriate for the product, (b) selecting a Confidence Level CL appropriate for the accuracy required from the results of the accelerated testing, (c) selecting the number of testing cycles $N_t$ defining the accelerated testing period, (d) calculating the Sample Size W for the accelerated testing as $$W = \frac{Log(1-CL)}{Log R(N_t)} \quad 1$$

where $R(N_t)$ is the reliability function.

(e) testing the W product samples for the $N_t$ testing cycles to validate the required Reliability when no test failures are observed over the $N_t$ testing cycles.

A similar method for determining the Number of Cycles $N_t$ required for accelerated testing of a product includes the steps:

(a) selecting a Reliability Goal R as appropriate for the product, (b) selecting a Confidence Level CL appropriate for the accuracy required from the accelerated testing, (c) selecting the number of product samples for the Sample Size W, (d) calculating the Number of Cycles $N_t$ for the accelerated testing as $$N_t = R^{-1}\left\{ \sqrt[W]{1-CL} \right\} \quad 2$$

where $R^{-1}$ is the inverse function of $R(n)$, and (e) testing the W product samples for the $N_t$ testing cycles to validate the required Reliability when no test failures are observed over the $N_t$ testing cycles.

In either of the above methods, if any failures are observed in the $N_t$ testing cycles, then the number of testing cycles may be extended to at least 2 $N_t$ and a new Confidence Level is calculated as:

$$CL_{NEW} = 1 - \sum_{x=0}^{NF} \frac{W!}{x!(W-x)!} [1-R(2N_t)]^x R^{W-x}(2N_t) \quad 3$$

where NF is the number of failed products within $2N_t$ cycles. The Reliability R for the product design is validated if the new Confidence Levels $CL_{NEW}$ is greater than a $CL_{min}$ value specified as a minimum confidence level required for the accelerated testing method.

BRIEF DESCRIPTION OF THE DRAWINGS

Other objects, features and advantages of the invention will be apparent from studying the written descriptions and the drawings in which.

DESCRIPTION OF THE PREFERRED EMBODIMENT

VERIFICATION TESTS BASED ON DAMAGE EQUIVALENCE

A physics-of-failure based approach to develop accelerated reliability verification tests for automotive components may be based on the damage equivalence technique. According to this approach, the acceleration level and the required test cycles/time in a test are determined by equating the damage induced in test and the damage induced in field application for a desired operational life. Most cycle/time related failures of electronic packages and mechanical components are due to the failure mechanism of fatigue, and the cumulative damage can be estimated by:

$$D = \frac{nS^m}{C} \qquad 4$$

where S is stress/strain amplitude, n is the number of testing cycles applied at the stress/strain level of S, and C and m are material fatigue properties. Equation 4 shows the linear relationship between the cumulative damage and the applied number of testing cycles. Failure occurs when total damage reaches one hundred percent. The number of cycles to failure is then determined by setting D=100% in Equation 1, which yields:

$$N = CS^m \qquad 5$$

Figure 1:
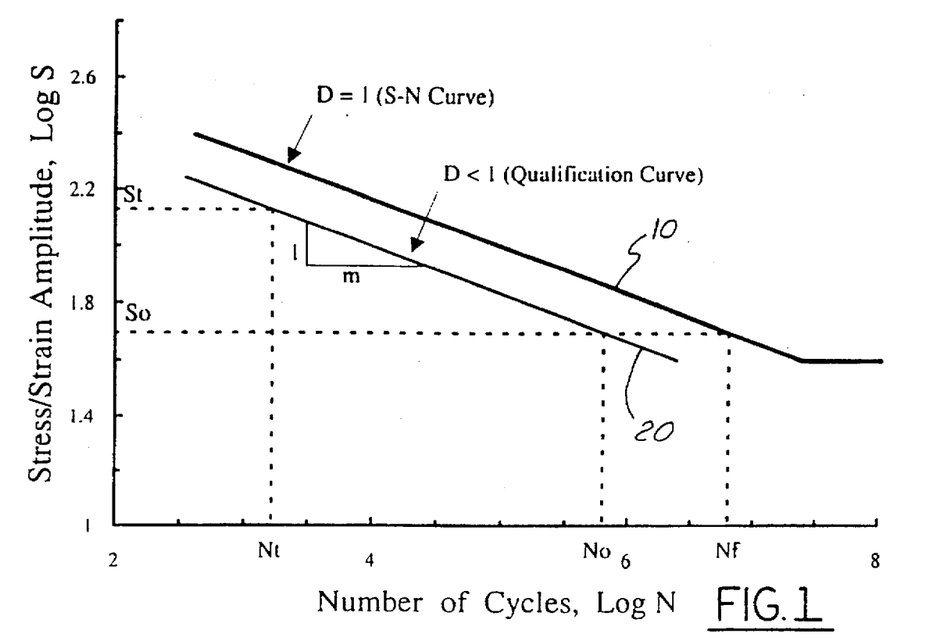
FIG. 1 is a plot showing the S-N fatigue curve and damage curve.

Plotting Equation 5 on a Log—Log scale gives the S-N fatigue curve as shown by curve 10 in FIG. 1. It can be observed from FIG. 1 that the fatigue property m is the inverse slope of the S-N curve. A qualification curve can be generated, as shown by curve 20 in FIG. 1, for a material that is not failed, but has a certain percentage of the cumulative damage (D<100%). According to Equation 4, the qualification curve has the same slope as the S-N curve, and the vertical distance between the verification/qualification curve 20 and the S-N curve 10 at the desired field operation life is the design margin.

In a laboratory verification test, in order to produce the damage which is the same as that induced in field operation for a desired operational life $N_o$ (not cycles to failure), the equivalent number of cycles in test $N_E$ is determined according to the verification curve:

$$N_E = \left[ \frac{S_t}{S_o} \right]^m N_O \qquad 6$$

where $S_t$ and $S_o$ are equivalent stress/strain amplitudes applied in laboratory test and field operation, respectively.

Figure 2:
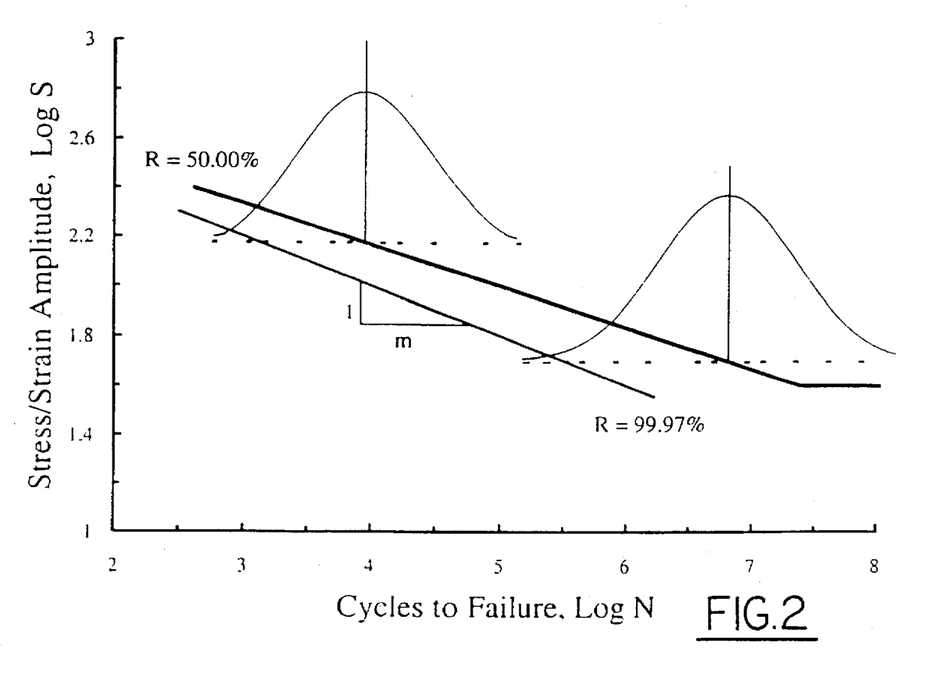
FIG. 2 is a plot of the R-S-N curve with a survival probability of R.

For a given level of stress/strain amplitude, even under very carefully controlled laboratory testing conditions, significant variation in fatigue life data is observed. The lognormal or Weibull distribution is assumed to provide a good model of fatigue life. The mean life, $\mu_N$ and the standard deviation of the life $\sigma_N$ can be estimated from test data, using statistical methods such as the maximum likelihood estimation. A dimensionless measure of variability can be defined by the coefficient of variation (COV), $\delta_N = \sigma_N/\mu_N$. In order to describe the variation of the S-N data, the R-S-N curve with a survival probability of R, as shown in FIG. 2, is often used. Therefore, the vertical distance between the verification curve and the R-S-N curve at the desired field operation life is the design margin with the reliability goal of R.

The problem of determining the sample size for the test may be analyzed as follows. Equation 6 specifies the equivalent number of cycles for products tested in the accelerated test condition corresponding to field life requirements. However, the confidence in a verification test is dependent on sample size. In general, the sample size W is related to the prespecified reliability goal R, confidence level CL, and allowable number of failures in the test NF. The confidence level is the probability that the quantity $$\frac{W - N}{W}$$

(the reliability estimate) is equal to the reliability goal R. According to statistical theory, this probability follows the Binomial distribution:

$$CI = 1 - \sum_{x=0}^{NF} \frac{W!}{x!(W-x)!} (1-R)^x R^{W-x} \qquad 7$$

Due to the large number of serially connected components existing in an automotive system, the allocated reliability goal for a component must be very high. With an acceptable confidence level (80% to 90%, for example), the high reliability goal yields unreasonably large sample size requirements. For example, if the reliability goal is R=99.9%, a confidence level CL=85%, and with only one failure being allowed in an accelerated verification test, the calculated sample size will be W=3155. This number is unreasonably large for most electronic packages and mechanical components. It is obvious that a more efficient assumption set must be found if the testing program is to be accelerated. Experience has shown that it is unwise to compromise verification testing in a high quality manufacturing environment by reducing the confidence level to be below about 80%. Actually, even with the confidence level of 70%, the required sample size is still too high (e.g., W=2439).

ACCELERATED TESTING WITH NO FAILURES ALLOWED

If the number of failures in verification testing is reduced to N=0 (that is, no failures are allowed in the test), then Equation 7 becomes:

$$CL = 1 - R^W \qquad 8$$

Therefore, the required sample size can be determined by the following equation:

$$W = \frac{\text{Log}(1 - CL)}{\text{Log} R} \qquad 9$$

Figure 3:
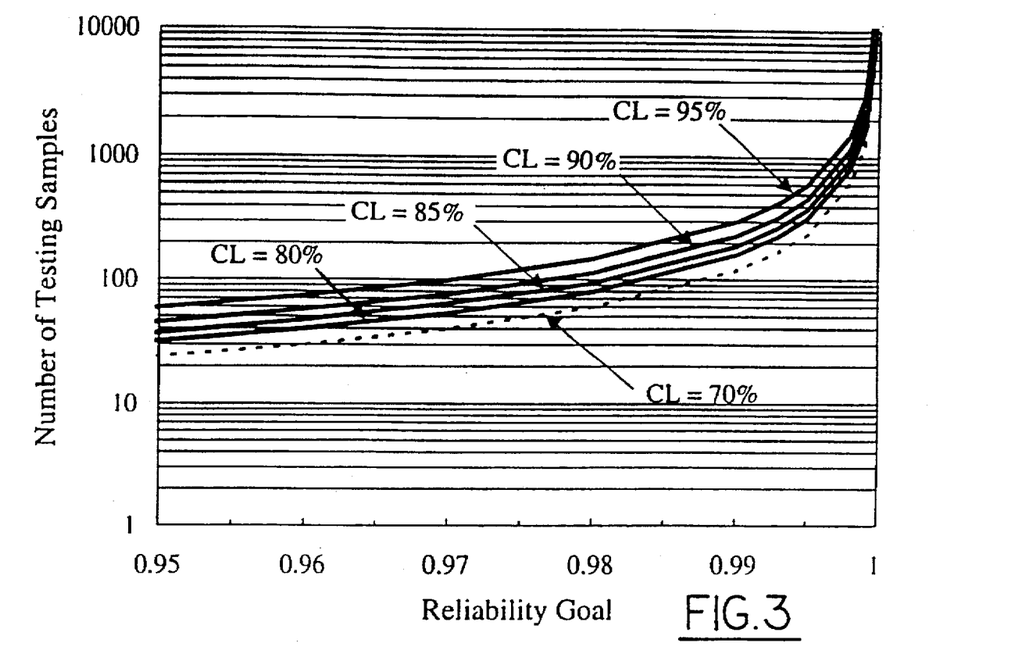
FIG. 3 is a plot of the relationship between the required sample size W and the reliability goal R for various Confidence Levels CL.

FIG. 3 shows the relationship between the required sample size and the reliability goal with various confidence levels. As shown in FIG. 3, with a reliability goal of R=99.9% and a confidence level of CL=85%, the required sample size in a verification test with no failures allowed will be W=1900. Even using a 70% confidence level, a sample size of 1204 still is required. These sample sizes are too large to conduct a verification test for commercial products, especially for automotive electronics and mechanical components. Therefore, an even more efficient assumption set must be developed.

An engineering technique for reducing the sample size may be accomplished as follows. In reality, product reliability is a function of the number of operational cycles before failure, for example, $$R = R(n) \qquad 10$$

where n is the required cycles in verification test, and R(n) is the reliability function. R(n) is a decreasing function of operating cycles n.

The concept of sample size reduction may be explained as follows. Assume that the reliability goal R is specified for a desired field life of 10,000 cycles and then assume that the equivalent number of test cycles is calculated to be 1000 based on the damage equivalence technique for a given accelerated stress level. Then, the reliability requirement for 1000 cycles should be R(1000)=R, because the damage induced in 1000 cycles of accelerated testing in the laboratory is known to be the same as that in field operation for 10,000 cycles. According to Equation 10, it is appropriate to consider that achieving the reliability requirement R(2000) at 2000 test cycles is equivalent to achieving R(1000) at 1000 test cycles. This is, if products are qualified at 2000 cycles with the reliability requirement of R(2000), then they are qualified at 1000 cycles with the reliability of R(1000) for the same stress condition. Since the reliability function is a decreasing function of the number of testing cycles (for example, R(2000)<R(1000)), the required sample size for a test running to 2000 cycles will be smaller than that in the same test running to 1000 cycles, if we assume the same confidence level. Substituting Equation 10 into Equation 9, the required sample size is determined as a function of the test cycles for the case where no failures are allowed:

$$W = \frac{Log(1-CL)}{Log R(N_t)} \qquad 11$$

Actually, an alternative technique could involve an increase in the stress amplitude level. However, any increase in the stress amplitude level from an already accelerated level takes the risk of shifting failure mechanisms, for example, from high cycle fatigue to low cycle fatigue. Therefore, the approach of increasing test cycle/time to reduce sample size is appropriate.

Based upon this set of assumptions, a process for determining the sample size W required for accelerated testing may be expressed as follows:

(a) The Reliability Goal (R) is specified for the product as appropriate based on the reliability allocation from the system reliability goal over the product service lifetime. A typical reliability goal of a product could be 99.99%, but this variable may be range from about 99% to 99.99999%.

(b) The Confidence Level (CL) appropriate for the accuracy of the calculation/answers required from the accelerated testing is specified. A typical CL is 85%, but this variable may range from about 70% to 95% depending on the critical nature of the application and the importance of the testing results to the survival of the product being tested.

(c) The Number of cycles $N_t$ (duration) to be included in the accelerated testing is specified. This variable may be selected based on the simultaneous availability of testing equipment for parallel testing, the availability of product samples to be tested, the acceptable elapsed time for all accelerated testing, etc. For example, if only a few testing systems are available, then the number of cycles will be determined largely by the availability of product samples to be tested and the acceptable elapsed time for all accelerated testing. Limited availability of product testing samples or long testing cycles may required different assumptions. $N_t$ may be measured in the number of cycles (e.g., power or temperature cycles) or continuous testing time (hours, days, weeks) where cyclic testing is not employed (e.g., vibration time in hours).

(d) The Sample Size (W) is calculated using Equation (11), which is $$W = \frac{Log(1-CL)}{Log R(N_t)} \qquad 12$$

(e) The W product samples are tested for the specified number of testing cycles $N_t$. If no failures are encountered in the W product samples tested, then the required Reliability has been validated and no further testing is required for the assumed values of CL and R. If one or more failures are encountered during the testing, then either the product must be redesigned to avoid the demonstrated failure, or further testing may be required.

Based upon this same set of assumptions, a process for determining the number of cycles $N_t$ required for accelerated testing may be expressed as follows:

(a) The Reliability Goal (R) is specified for the product as appropriate based on the reliability allocation from the system reliability goal over the product service lifetime. A typical reliability goal of a product could be 99.99%, but this variable may be range from about 99% to 99.99999%.

(b) The Confidence Level (CL) appropriate for the accuracy of the calculation/answers required from the accelerated testing is specified. A typical CL is 85%, but this variable may range from about 70% to 95% depending on the critical nature of the application and the importance of the testing results to the survival of the product being tested.

(c) The number of product samples available for the sample size W of the accelerated testing program is specified. This variable may be selected based on the number of product samples available (such as when only a few prototypes are available for testing), the availability of testing equipment, the acceptable elapsed time for all accelerated testing, etc., as discussed in more detail with respect to the previous process.

(d) The number of cycles $N_t$ required for accelerated testing is calculated using the following equation which is derived from Equation (11):

$$N_t = R^{-1}\left\{ \sqrt[W]{1-CL} \right\}$$

where $R^{-1}$ is the inverse function of R(n).

(e) The W product samples are tested for the specified number of testing cycles $N_t$. If no failures are encountered in the W product samples tested, then the required Reliability has been validated and no further testing is required for the assumed values of CL and R. If one or more failures are encountered during the testing, then either the product must be redesigned to avoid the determined failure, or further testing may be required.

Using this approach and assumption set, two examples will be provided for demonstrating the technique of sample size determination. One example involves he thermal cycle testing of leadless solder joints associated with chip resistors in electronics modules. A second example involves the random vibration test for electronic module mounting brackets.

EXAMPLE 1

SOLDER JOINTS WITH CHIP RESISTORS IN ELECTRONICS MODULES

The solder joints with chip resistors are a significant concern for reliability of electronic modules. For leadless solder joints in an electronic module operated in the passenger/luggage compartment of an automotive vehicle, the effective temperature range is approximately 43° C. If the reliability verification test is conducted at a temperature range from −30° C. to 100° C., the equivalent number of testing cycles is 844, which corresponds to 7300 cycles of operational life. The reliability function of leadless solder joints often follows the modified Weibull distribution as follows:

$$R(n) = 0.5 \left[ \frac{n}{\eta} \right]^4 \qquad 14$$

where $\eta$ is the characteristic life. Once $\eta$ is determined, the reliability function is determined. In this case, $\eta$ characterizes the product quality for the reliability requirement R(n) at the operating cycle 844.

For example, if the reliability goal for solder joints is R(844)=99.9% through the reliability allocation, the characteristic life $\eta$ is determined as follows:

$$\eta = n \left[ \frac{\text{Log}0.5}{\text{Log}R(n)} \right]^{1/4} = 844 \times \left[ \frac{-0.301}{-0.00043} \right]^{1/4} = 4330 \qquad 15$$

Therefore, for a given confidence level, substituting Equations 9 and 11 into Equation 8 gives the following required sample size as a function of the number of thermal cycles:

$$W(n) = \frac{\eta^4 \text{Log}(1-CL)}{\log 0.5 n^4} = -\frac{1.168 \times 10^{15} \text{Log}(1-CL)}{n^4} \qquad 16$$

which results in $$W(n) = 8.18 \times 10^{14} \, n^4 \text{ for CL}=80\% \qquad 17$$

$$W(n) = 1.17 \times 10^{15} \, n^4 \text{ for CL}=90\%$$

Figure 4:
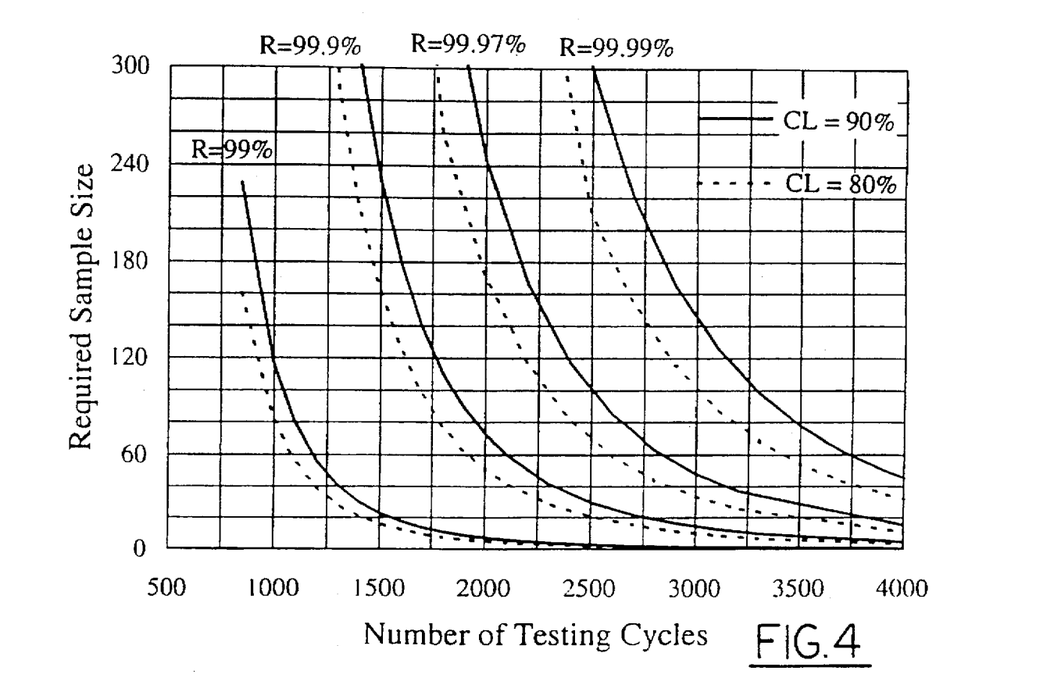
FIG. 4 is a plot of required sample sizes W as a function of the number of testing cycles $N_t$ for Reliability Goals R equal to 99.0%, 99.9%, 99.97% and 99.99% for a specific testing example (Example 1).

For other reliability goals, the required sample sizes can be determined by using the same process. FIG. 4 shows the required sample size as a function of the number of testing cycles for reliability goals of 99.0%, 99.9%, 99.97%, and 99.99%, respectively. The solid lines are for the Confidence Level of 90% and the dashed lines are for the Confidence Level of 80%.

The required sample size can be determined for a given reliability goal either by the above calculations or from the diagram in FIG. 4. For example, if the reliability goal is 99.97% with a confidence level of 90%, the solder joints should be tested, without failure, to 2300 cycles with a sample size of 140. If the sample size is limited to 60, the required number of test cycles would be 2850 cycles.

EXAMPLE 2

MODULE MOUNTING BRACKETS

Figure 5:
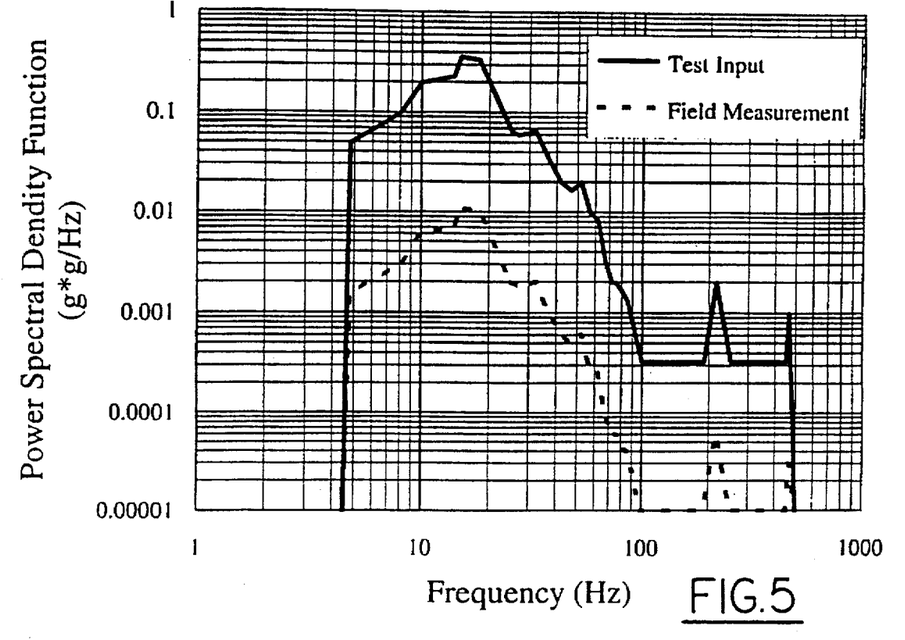
FIG. 5 is a plot of power spectral density function measured in field and that for the accelerated vibration testing of an electronic module mounting bracket (Example 2).

A steel bracket may be used to mount an electronic ignition module in the under-hood area of a passenger car. An accelerated random vibration test may be used to qualify the brackets for high-cycle fatigue. Assume that the field vibration acceleration can be described by the power spectral density (PSD) function presented in SAE J1211 environmental practices for electronic equipment. The vibration is applied in the frequency range from 4.5 Hz to 250 Hz, as shown by the dashed line in FIG. 5. In order to verify the reliability for 100,000 miles, an equivalent duration of six hours is specified at the level shown by the solid line in FIG. 5. Corresponding to this level the exaggeration factor is 32.74.

For steel, it is reasonable to assume that the fatigue reliability function follows the lognormal distribution, that is:

$$R(t) = \Phi \left[ \frac{\mu_N - \log t}{\sigma_N} \right] \qquad 18$$

where $\phi$ is the standard cumulative normal distribution function, $\mu_N$ and $\sigma_N$ are the mean value and standard deviation of the logarithm value of the life. Since the experimental data for this particular material is not available, it is conservative to estimate the relationship between $\mu_N$ and $\sigma_N$ as:

$$\sigma_N = 0.125 \mu_N \text{ or } \delta = 12.5\% \qquad 19$$

Therefore, the product quality for the reliability requirement R(n) at the end of six testing hours can be characterized by the parameter $\mu_N$.

For example, if the reliability goal of the bracket is R(6)=99.9%, then through the reliability allocation the characteristic life $\mu_N$ is determined as follows:

$$\mu_N = \frac{\text{Log}t}{1 - 0.125 \Phi^{-1}[R(6)]} = \frac{\text{Log}6}{1 - 0.125 \times 3.1} = 2.925 \qquad 20$$

Therefore, for a given confidence level, substituting Equations 14 and 17 into Equation 8 gives the following required sample size as the function of vibration test time:

$$W(t) = \frac{\text{Log}(1-CL)}{\text{Log}\Phi[8 - 2.735 \text{Log} t]} \qquad 21$$

Figure 6:
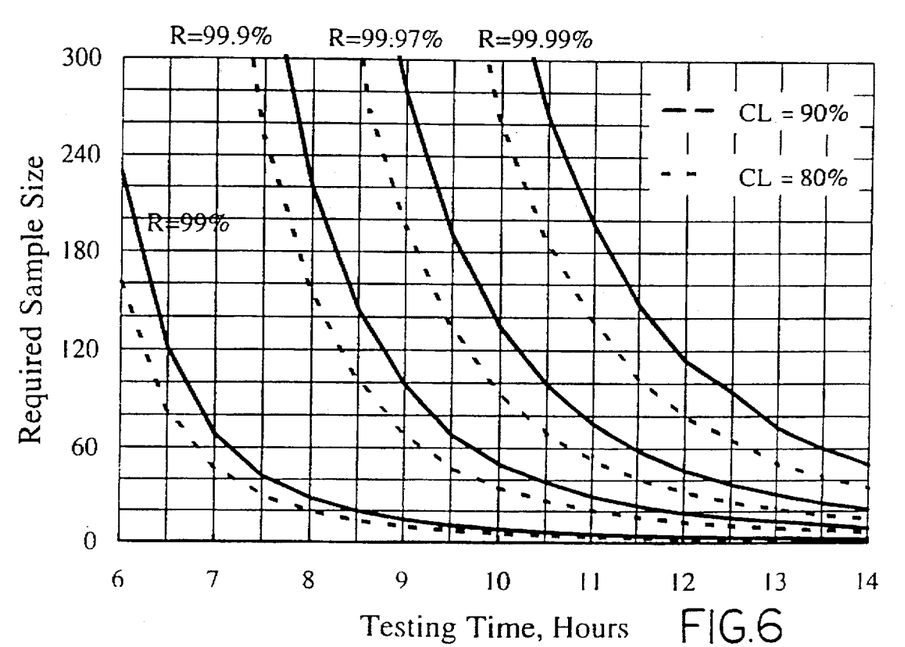
FIG. 6 is a plot of the required sample size W as a function of testing time for reliability goals R of 99%, 99.9%, 99.97% and 99.99% for a specific testing example (Example 2).

Similarly, for other values of reliability goals, the required sample sizes can be determined by using the same procedure. FIG. 6 shows the required sample size vs. testing time for reliability goals of 99.0%, 99.9%, 99.97%, and 99.99%, respectively. The solid lines are with a confidence level of 90% and the dashed lines are with a confidence level of 80%. From FIG. 6, the required sample size can be determined normally for a given reliability goal. For example, if the reliability goal is 99.97% with the confidence level of 90%, then the bracket should be tested without failure to 10.5 hours with the sample size of 60. If the sample size is limited to 20, the required testing time is 14 hours.

ACCELERATED TESTING WITH FAILURES

The processes and examples discussed above address the relationship between the required sample size and test cycles/time with no failures allowed. In many situations, failures do occur during tests. This raises the question whether or not the product being tested still meets the reliability goal for the specified test cycles/time when one or more failures are encountered. This question can be answered by calculating the confidence level according to Equation 7. In using Equation 7 to determine the confidence level, the term R is not the reliability goal as discussed previously, but now becomes the reliability requirement at total tested cycles/time.

The process for determining the confidence level of the product(s) being tested begins with the same steps as previously explained above.

(a) The Reliability Goal (R) is specified for the product, as appropriate, based on the reliability allocation from the system reliability goal over the product service lifetime. A typical reliability goal of a product could be 99.99%, but this variable may be range from about 99% to 99.99999%.

(b) The Confidence Level (CL) appropriate for the accuracy of the calculation/answers required from the accelerated testing is specified. A typical CL is 85%, but this variable may range from about 70% to 95% depending on the critical nature of the application and the importance of the testing results to the survival of the product being tested.

(c) Either $N_t$ (the number of testing cycles or testing duration) or W (the sample size) is selected, based upon the specific requirements in the case.

(d) Next, the remaining variable, either $N_t$ or W (the variable not selected in step (c)), is calculated using the appropriate equation as explained above.

(e) Testing is initiated with the specified values of R, CL, $N_t$ and W, but at least one failure occurs before $N_t$ is reached.

(f) If failures are numerous with respect to W (for example, 20%) or occur early with respect to $N_t$ (for example, before 50% $N_t$), then testing is usually terminated and the root cause of the failure mode must be determined in order to redesign the portion of the product or the manufacturing process contributing to the failures.

(g) If failures are few and occur relatively late in the testing program, then the testing program is completed for $N_t$ and W.

(h) If at the completion of the initial testing program for the duration $N_t$ and for all W the failures continue to be small with respect to W, then the duration/cycles of the test are extended by a factor of between 2 to 5, with the factors 2 or 3 being used in the preferred mode of the process. This factor should be toward the higher end of the range if the failures are numerous compared to W and/or are early with respect to $N_t$.

(i) After completion of the extended testing program in the previous step, the new Confidence Level CL is calculated using equation (4) above:

$$Cl = 1 - \sum_{x=0}^{NF} \frac{W!}{x!(W-x)!} [1 - R(N_t)]^x R^{w-x}(N_t) \qquad 22$$

where x is iterated from $\emptyset$ to NF=number of failed products, and $N_t$ is the extended test duration and W is sample size.

(j) The calculated Confidence Level CL is compared to a minimum Confidence Level $CL_{min}$ that is determined by considering the resulting effects of the failure mode experienced and the critical nature of the test results to the survival of the products being tested. For high volume, in high quality automotive component design and manufacturing applications, $CL_{min}$ should be in the range of 75% to 90%, with 80% being preferred. If $CL > CL_{min}$, then the required Reliability R has been validated. If $CL < CL_{min}$, then the root cause of the failure mode(s) must be determined and the product or manufacturing process corrected to avoid or minimize the failure.

For the case of thermal cycling test of solder joints discussed earlier in Example 1, the sample size can be assumed to be W=200. And for the case of random vibration test, the sample size can be assumed to be W=30.

It can be calculated from Equation 22 that for a sample size of 200, if the reliability goal is 99%, only one failure is allowed within 1000 cycles. If two failures occur before 1000 cycles, the testing must be continued. If the reliability goal is 99.99%, the testing must be continued to 3000 cycles with only one failure allowed.

Similarly, for the random vibration test of the module mounting brackets explained in Example 2 above, it can be calculated from Equation 22 that if the reliability goal is 99%, no failure is allowed in an eight hour test. If any failure occurs, the test must be extended to ten hours. If the reliability goal is 99.95%, testing must be extended to twelve hours and no failures are allowed.

This additional testing beyond the initially calculated accelerated testing minimums must be conducted to confirm if the evaluation based upon the first failures in the sample group is consistent with the remainder of the testing population.

In summary, the confidence level of an accelerated reliability test is dependent on the reliability requirement, the sample size, and the number of allowed failures. The reliability requirement could be altered by increasing the level of accelerated stress or expanding the test cycles/time. There are three approaches to reduce the sample size for a given reliability goal and confidence level: (i) increase the acceleration level, (ii) increase test cycles/time, and (iii) decrease the allowable number of failures. The first approach takes the risk of shifting the failure mechanism by increasing an already accelerated stress level. Therefore, the present invention focuses on a method to reduce the sample size based on the second and third approaches. The present invention utilizes a method/process for reducing the test sample size requirement for the specific reliability goal by expanding the test cycles/time from that correlated to field operational condition.

Figure 7:
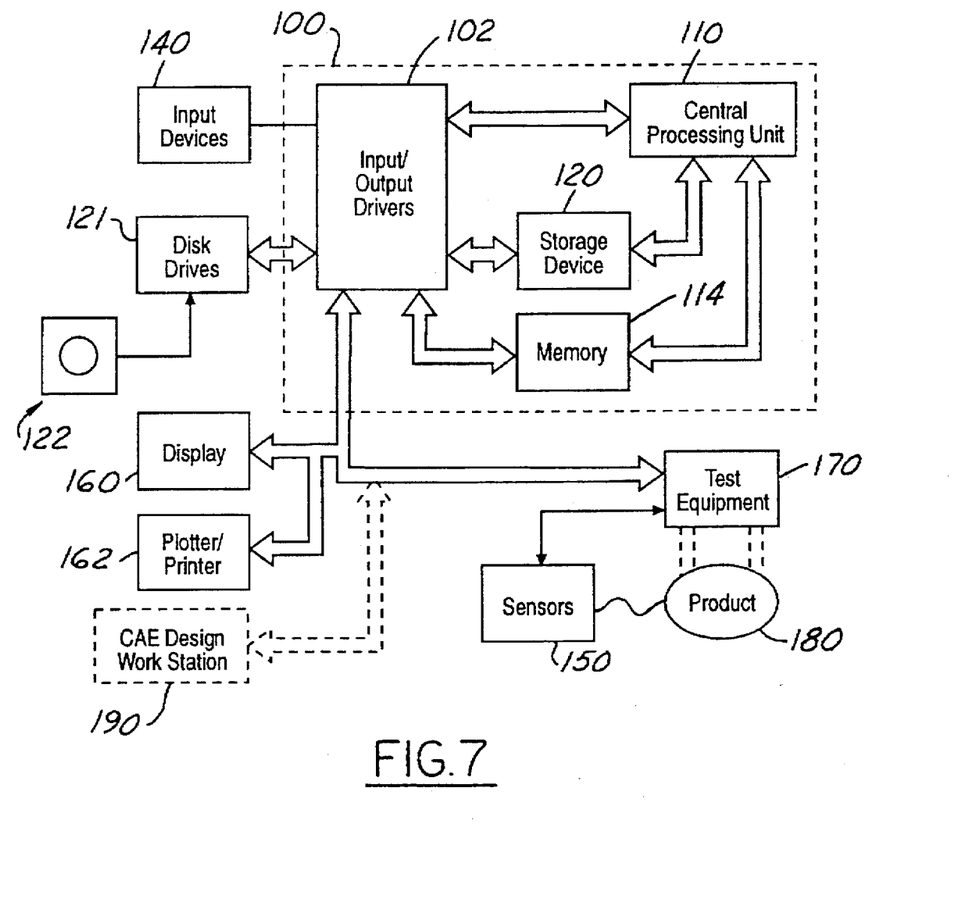
FIG. 7 illustrates a schematic block diagram of a computer system as controlled by the method and program in accordance with the method of the present invention.

The method in accordance with the present invention may be implemented either on a special purpose computer/ microcontroller or on the general purpose computer which is illustrated generally as 100 in FIG. 7. The computer 100 includes input/output driver circuitry 102 that receives data from input devices 140 and sensors 150. An example of input device 140 would be a computer keyboard, while an example of the sensors 150 would include voltage sensors, vibration sensors, strain gauges, accelerometers, load cells, torque sensors, etc. The input/output drivers 102 are coupled to a central processing unit (CPU) 110 that performs calculations and other steps in accordance with the method described herein. An example of a CPU used for the present invention would be PA-RISC 7200 processors from Hewlett-Packard Company, Palo Alto, Calif. The program that directs the central processing unit 110 is stored within a storage device 120, that may comprise a hard drive, a floppy drive, non-volatile memory or some other storage medium capable of recording and playing back algorithms and computer programs in accordance with the present invention. The storage device 120 also may include various physical parameters, distributions, materials data bases, load (environmental or road load) data bases, physical characterizations, etc., that are required during the execution of the computer program, and which may be stored and retrieved most efficiently on the storage device 120. The central processing unit 110 is also coupled to sufficient memory 114 for receiving and storing selected portions of the computer program and data being operated upon by the central processing unit 110.

Other outputs of the input/output drivers 102 may be coupled to a system display 160 and plotter/printer 162, such as a CRT display, and to test equipment 170 that operates upon the product being tested 180. The test equipment 170 may respond directly to commands from the computer 100 as required to specify the frequency distribution, amplitude, voltages, etc., in order no control the testing on the product 180. Examples of test equipment 170 include load amplifiers, shaker tables, exciter controller, recorders, conditioning amplifiers, measuring amplifiers, and force transducers. As previously discussed, multiple sensors 150 may be coupled either directly to the product 180 (such as voltage sensors, strain gauges, accelerometers, load cells, torque sensors) or the sensors 150 may be coupled, either directly or indirectly, to the test equipment 170 (such as position sensors, strain gauges or other similar sensors) if such sensors are not included in the test equipment 170.

The method in accordance with the present invention may be completely automated on a general purpose computer, such as the one illustrated in FIG. 7, or may be partially implemented through operator controllers of the test equipment and sensors in accordance with information and instructions illustrated on the display 160. Various alphanumeric inputs may be entered through the input device 140 or through various transportable storage media 122. Examples of such transportable storage media include magnetic floppy disks, magnetic tapes and optical disks that may be read through compatible drives 121, that in turn are coupled to either the input/output drivers 102 or directly to the storage device 120. Either the method/program in accordance with the present invention, or various data necessary for running the program, or both, may be stored upon and distributed by means of the magnetic storage medium 122.

It also may be possible to couple the output of a Computer Aided Engineering (CAE) workstation 190 to either the input device 140 or directly to the input/output drivers 102 of the computer 100. In this manner, CAE workstation designs, rather than actual prototype testing data, may be fed directly into the computer 100 for analysis and testing in accordance with the method of the present invention. In a similar manner, it may also be possible to couple the input/output drivers 102 directly to the CAE workstation so that results of the testing and analysis may be coupled directly to the product design being developed in the CAE workstation so that appropriate product design parameters may be adjusted in accordance with the test results. It also may be possible to simulate the accelerated testing methodology on a CAE workstation using finite element analysis and durability analysis techniques rather than building a prototype and testing it on the test equipment 170 and with the sensors 150 as discussed above. This simulation testing may be accomplished either on the computer 100, or a computer program in accordance with the teachings of the present invention may be incorporated as a module into the software used in the CAE workstation to design and analyze the product. Under these circumstances, the computer program in accordance with the present invention would probably be executed directly upon the CAE workstation 190.

Figure 8:
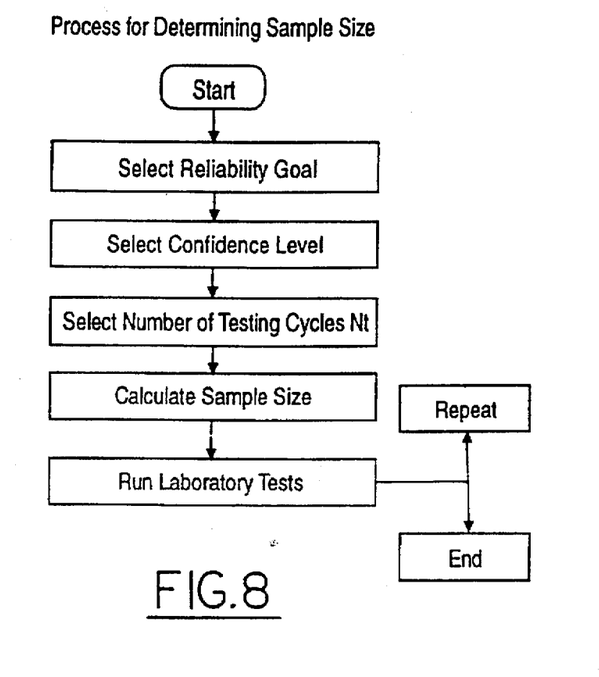
FIG. 8 is a flow diagram for a computer program for determining sample sizes in accordance with the present invention.
Figure 9:
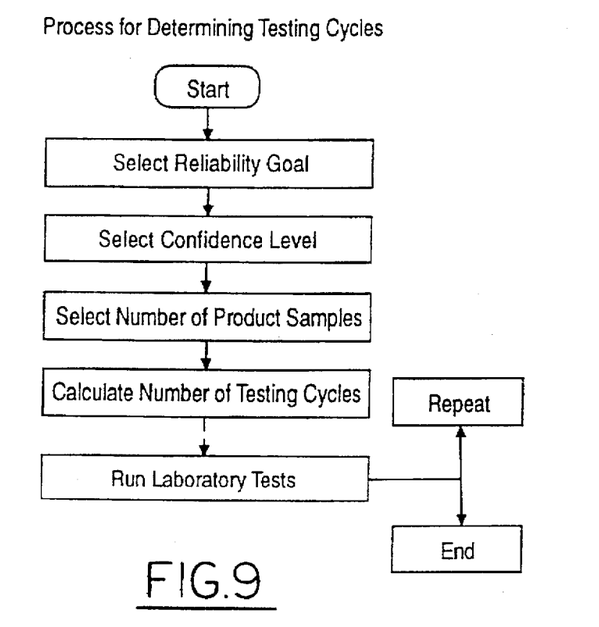
FIG. 9 is an alternate flow diagram for a computer program for determining testing cycles in accordance with the present invention.

Logic flow diagrams for implementing the two alternate methods in accordance with the present invention on a computer are illustrated in FIGS. 8 and 9.

While the best mode of the present invention has been described in detail, one skilled in this art will be capable of numerous variations, modifications and adaptations without departing from the spirit and scope of the present invention. It should be understood that the present invention is not limited to the processes embodiments or examples contained herein, but are limited only by the scope of the following claims.

I claim:

1. An application program stored in a memory and executed in a computer for performing the method of determining a Sample Size W required for accelerated testing of a product, the method comprising the steps:

(a) selecting a Reliability Goal R as appropriate for the product, (b) selecting a Confidence Level CL appropriate for an accuracy required from the results of the accelerated testing, (c) selecting a number of testing cycles $N_t$ defining the accelerated testing period, (d) calculating the Sample Size W for the accelerated testing as $$W = \frac{Log(1 - CL)}{Log R(N_t)}$$

(e) testing the W product samples for the $N_t$ testing cycles to validate the required Reliability Goal R when no test failures are observed over the $N_t$ testing cycles.

2. The application program for accelerated testing as described in claim 1, further comprising the step of:

(f) redesigning the product to eliminate the root cause of failures observed in the $N_t$ testing cycles.

3. The application program for accelerated testing as described in claim 1, further comprising the step of:

(f) extending the number of testing cycles to at least $2 N_t$ following any failures of the products in the Sample Size W, (g) calculating a new Confidence Level as $$CL_{NEW} = 1 - \sum_{x=0}^{NF} \frac{W!}{x!(W-x)!} [1 - R(2N_t)]^x R^{w-x}(2N_t)$$

where NF is a number of failed products within $2N_t$ cycles, (h) validating the Reliability Goal R for the product design if the new Confidence Level $CL_{NEW}$ is greater than a $CL_{min}$ value specified as a minimum Confidence Level required for the accelerated testing method.

4. The application program for accelerated testing as described in claim 1, further comprising the substep of:

(a1) selecting the Reliability Goal R from the range of about 99% to 99.9999% representative of the level of reliability required from the product.

5. The application program for accelerated testing as described in claim 1, further comprising the substep of:

(b1) selecting the Confidence Level CL from the range of about 80% to 90% representative of the Confidence Level required for the accelerated testing method.

6. A computer system for determining a Number of Cycles $N_t$ required for accelerated testing of a product in accordance with an application program that controls test equipment coupled to and for testing the product in accordance with a test signal, the system comprising:

a central processing unit coupled to and for controlling said testing equipment, a memory for storing the application program for controlling the central processing unit, the application program comprising:

program means for selecting a Reliability Goal R as appropriate for the product, program means for selecting a Confidence Level CL appropriate for an accuracy required from the accelerated testing, program means for selecting the number of product samples for a Sample Size W, program means for calculating the Number of cycles $N_t$ for the accelerated testing as $$N_t = R^{-1}\left\{ \sqrt[W]{1 - CL} \right\}$$

where $R^{-1}$ is the inverse function of R(n), and program means for generating said test signal for testing the W product samples for the $N_t$ testing cycles to validate the required Reliability Goal R when no test failures are observed over the $N_t$ testing cycles.

7. The computer system for accelerated testing as described in claim 6, further comprising:
   program means for redesigning the product to eliminate the root cause of early failures observed in the $N_t$ testing cycles.

8. The computer system for accelerated testing as described in claim 6, further comprising:
   program means for extending the number of testing cycles to at least $2 N_t$ following any failures of the products in the Sample Size W,
   program means for calculating a new Confidence Level as $$CL_{NEW} = 1 - \sum_{x=0}^{NF} \frac{W!}{x!(W-x)!} [1 - R(2N_t)]^x R^{w-x}(2N_t)$$

where NF is a number of failed products within $2N_t$ cycles,
   program means for validating the Reliability Goal R for the product design if the new Confidence Level CL is greater than a $Cl_{min}$ value specified as a minimum Confidence Level required for the accelerated testing method.

9. The computer system for accelerated testing as described in claim 6, further comprising:
   program means for selecting the Reliability Goal R from the range of about 99% to 99.9999% representative of the level of reliability required for the product.

10. The computer system for accelerated testing as described in claim 6, further comprising:
    program means for selecting the Confidence Level CL from the range of about 70% to 95% representative of the Confidence Level required for the accelerated testing method.

11. A computer readable memory for storing an application program that controls a central processing unit for performing the method of determining a Sample Size W required for accelerated testing of a product, the method comprising the steps:
    (a) defining a Reliability Goal R as appropriate for the product,
    (b) selecting a Confidence Level CL appropriate for an accuracy required from the results of the accelerated testing,
    (c) defining a number of testing cycles $N_t$ defining the accelerated testing period,
    (d) instructing the central processing unit to calculate the Sample Size W for the accelerated testing as:

$$W = \frac{Log(1 - CL)}{LogR(N_t)}$$

(e) instructing the central processing unit to test the W product samples for the $N_t$ testing cycles to validate the required Reliability Goal R when no test failures are observed over the $N_t$ testing cycles;
    (f) instructing the central processing unit to extend the number of testing cycles to at least $2 N_t$ following any failures of the products in the Sample Size W during the $N_t$ testing cycles,
    (g) instructing the central processing unit to calculate a new Confidence Level as $$CL_{NEW} = 1 - \sum_{x=0}^{NF} \frac{W!}{x!(W-x)!} [1 - R(2N_t)]^x R^{w-x}(2N_t)$$

where NF is a number of failed products within $2N_t$ cycles,
    (h) instructing the central processing unit to validate the Reliability Goal R for the product design if the new Confidence Level CL is greater than a $Cl_{min}$ value specified as a minimum Confidence Level required for the accelerated testing method.

12. The computer readable memory as described in claim 11, further comprising the substep of:
    (a1) instructing the central processing unit to select the Reliability Goal R from the range of about 99% to 99.9999% representative of the level of reliability required for the product.

13. The computer readable memory as described in claim 11, further comprising the substep of:
    (b1) instructing the central processing unit to select the Confidence Level CL from the range of about 80% to 90% representative of the Confidence Level required for the accelerated testing method.

* * * * *